July 22, 1958 E. A. SCHULZ 2,844,379
LEVER ACTUATED CHUCK
Filed Oct. 28, 1954
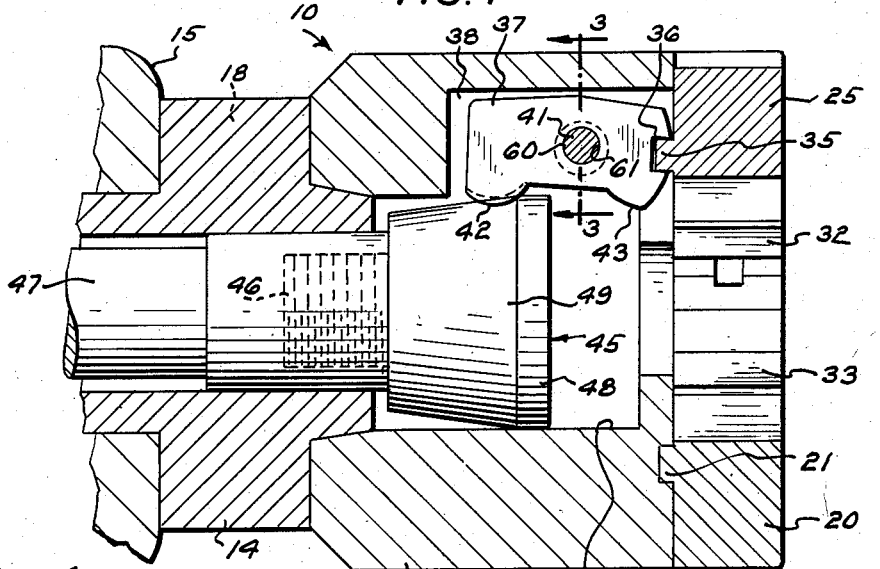
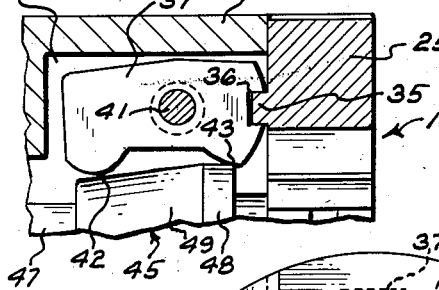
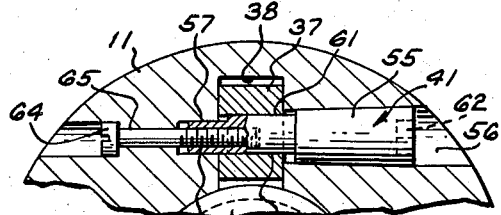
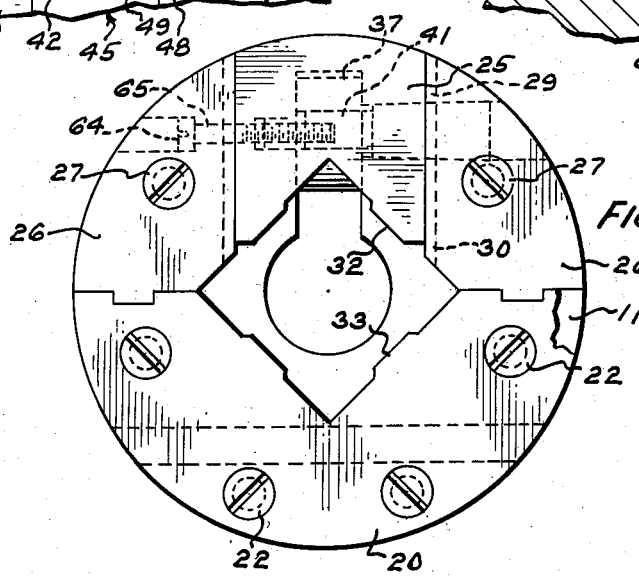
INVENTOR
E. A. SCHULZ
BY C. B. Hamilton
ATTORNEY

United States Patent Office 2,844,379
Patented July 22, 1958

2,844,379

LEVER ACTUATED CHUCK

Edward A. Schulz, Clarendon Hills, Ill., assignor to Western Electric Company, Incorporated, New York, N. Y., a corporation of New York Application October 28, 1954, Serial No. 465,181

3 Claims. (Cl. 279—120)

This invention relates to jaw chucks and more particularly to chucks having mechanism for actuating the jaws to open and closed position and locking them in said positions.

An object of the invention is to provide jaw chucks having simple and effective mechanism for actuating the movable jaws to open and closed positions and locking the jaws in said positions.

A chuck illustrating certain features of the invention may include an annular chuck body capable of being secured to a lathe spindle for rotation therewith and having a stationary jaw and a movable jaw mounted on one end thereof. The movable jaw is guided for radial movement toward and away from said stationary jaw to grip an article therebetween and is pivotally connected to one end of a lever which is longitudinally disposed within the chuck body and mounted for pivotal movement intermediate its ends and has inwardly directed rear and forward came surfaces on opposite end portions thereof. A cam member, which is supported for axial movement in a central cylindrical recess in the chuck body and is connected to a draw bar reciprocable within the spindle, has a self-locking tapered portion engageable with the rear cam surface on the lever for rocking the lever and moving the movable jaw to a closed position and locking the jaw in said position in response to movement rearwardly of the cam member. In response to forward axial movement of the cam member the tapered surface thereof releases the rear end of the lever for movement and the forward end of the cam member engages the forward cam surface of the lever and rocks it to move the movable jaw to an open position and lock it in said position.

Other objects and advantages of the invention will become apparent by reference to the following detailed description and the accompanying drawings illustrating a preferred embodiment thereof, in which Fig. 1 is a longitudinal vertical sectional view of a chuck embodying the invention shown attached to the spindle and showing the jaws thereof in closed position;

Fig. 2 is a front elevational view of the chuck;

Fig. 3 is a detailed cross-sectional view taken on the line 3—3 of Fig. 1; and

Fig. 4 is a fragmentary view of the chuck showing the jaws in open position.

Referring to the drawings the chuck 10 comprises an annular body member 11 having a central axial cylindrical recess 12 and has the rear end portion thereof shaped to seat on and be secured to one end of a spindle 14 of a lathe 15 or similar machine. The chuck 10 is secured to the spindle 14 by any suitable means such as a plurality of studs 18 secured to one end of the body member 11 and extending into the apertures in the spindle and secured thereto by locking means (not shown) in a well known manner.

At its forward end the body member 11 has a stationary jaw 20 secured thereto by a key 21 and screws 22. A movable jaw 25 is guided for radial movement toward and away from the stationary jaw in a pair of guide members 26 which are secured to the forward end of the chuck body 11 by screws 27 and are interlocked with the upper ends of the stationary jaw 20 by tongue and groove means 28. The tongues 29 formed on opposite sides of the movable jaw 25 engage in the grooves 30 of the guide members 26 and serve to prevent axial displacement of the movable jaw. The movable and stationary jaws are provided with V-shaped notches to provide notched gripping faces 32 and 33 for receiving and clamping the square portions of articles therebetween.

The rear portion of the movable jaw 25 is provided with a tongue 35 which engages in a groove 36 in one end of an actuating lever 37 for effecting an operative connection therebetween. The lever 37 is disposed in a longitudinal slot or recess 38 in the body member 11 and is mounted intermediate its ends on a pivot pin 41 for oscillatable movement. A rear cam surface 42 and a forward cam surface 43 are formed on the inwardly directed faces of the rear and forward end portions of the lever 37 as shown in Figs. 1 and 4 for cooperation with an actuating cam 45 guided for axial movement in the recess 12 of the body member 11. The cam 45 has a reduced threaded end 46 which is secured to one end of a draw bar 47 axially reciprocable within the spindle 14 and capable of being selectively moved in opposite directions in a well known manner. The cam 45 has a relatively narrow cylindrical surface 48 slidably engageable with the walls of the recess 12 and has a relatively long tapered portion 49, the taper of which is relatively small.

In response to movement of the actuating cam member 45 and the draw bar 44 from the position shown in Fig. 1 to the position shown in Fig. 4 the forward end of the cam 45 engages the cam surface 43 of the lever 37 and oscillates it in a counterclockwise direction as viewed in Figs. 1 and 4 to actuate the movable jaw 25 to its open position as shown in Fig. 4, and the cylindrical surface 48 is disposed beneath the forward cam surface 43 of the lever and serves to lock it in open position. In response to movement of the cam 45 and the draw bar 47 in the opposite direction the cam 45 is withdrawn from engagement with the cam surface 43 and the tapered surface 49 of the cam engages the rear cam surface 42 of the lever 37 and imparts oscillation to the lever to actuate the movable jaw 25 into a closed position to clamp a part against the stationary jaw 20. The tapered portion 49 of the cam 45 is such that it serves to lock the lever 37 and the movable jaw 25 in their advanced or closed positions to clamp an article against the stationary jaw 20. Thus, it will be seen with this construction the jaw is positively actuated to its open and its closed positions and locked in said positions.

Means are provided for adjusting the pivot pin 41 to compensate for the wear of the gripping surfaces 32 and 33 of the movable and stationary jaws. The pivot pin 41 has a tapered end portion 55 journalled in a tapered aperture 56 in the body member 11 and a cylindrical end portion 57 journalled in a bearing aperture 58 in the body member 11. Intermediate the concentric end portions 55 and 57 the pivot pin 41 has an eccentrically disposed cylindrical portion 60 engageable in a bore 61 in the lever 47 for pivotally supporting it. By means of a turning tool (not shown), one end of which is insertable in a socket 62 in the tapered portion 55 of the pivot pin, the pivot pin may be rotated to change the angular position of the eccentric portion 60 and adjust the pivotal axis of the lever 37 relative to the axis of the chuck 10. After the adjustment has been made the pivot pin 55 is forced to the left by a locking screw 64 to move the tapered portion 55 of the pivot pin into tight engagement with the walls of the tapered aperture 56 to lock the pin against turning movement.

Although the chuck selected to illustrate one embodiment of the invention has a movable jaw and a stationary jaw, it will be understood that the stationary jaw may be dispensed with and the chucks may be provided with two or more movable jaws actuated to their open and their closed positions and locked in said positions in the same manner of operation as disclosed in the present embodiment.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a chucking device the combination of a chuck body, a jaw mounted for movement on said body, a lever for actuating said jaw to and from open and closed positions and having a pair of cam surfaces on its ends, a pivot pin having a first cylindrical portion mounted in said body for oscillatable movement and having a second cylindrical portion eccentrically disposed relative to the first cylindrical portion for pivotally supporting the lever intermediate its ends, means for turning the pin to adjust the axis of pivotal movement of said lever, means for locking said pin in adjusted position, and a cam element supported on said body for reciprocable movement and alternately engageable with said cam surfaces and operable in response to movement in one direction to engage one cam surface for actuating the lever and moving the jaw to its closed position and locking it in said position and operable in response to movement in the opposite direction to engage the other cam surface for actuating said lever and moving said jaw to its open position and locking it in said position.

2. In a chucking device the combination of a chuck body adapted to be attached to a lathe spindle and having an axial recess, a plurality of jaws, means mounting said jaws on said chuck body and for movement of at least one of said jaws radially toward and away from another jaw to closed and open positions, a lever longitudinally disposed in said jaw body in spaced relation to the axis of said body, means for pivotally supporting said lever intermediate its ends for oscillatable movement, tongue and groove means interconnecting the movable jaw and one end of said lever for imparting the movement of said lever to said jaw, said lever having inwardly directed cam surfaces on opposite ends thereof, a cam member adapted to be attached to an axially movable actuating element and mounted in the central recess of said body for axial movement with said element, said cam member having a self-locking conical portion engageable with the cam surface on one end of said lever and operable in response to movement of said cam member in one direction for oscillating said lever and moving said movable jaw inwardly to a closed position and locking it in said position, said cam member having a portion thereof engageable with the cam surface on the other end of said lever for oscillating said lever and moving said movable jaw outwardly to an open position and locking it in said position in response to movement of said cam member in the opposite direction, and means for adjusting the position of the supporting means for said lever.

3. In a chucking device the combination of a chuck body adapted to be attached to a spindle and having an axial recess and a stationary jaw, a movable jaw, means mounting said movable jaw on said chuck body for radial movement toward and away from said stationary jaw to and from closed and open positions, a lever longitudinally disposed in said chuck body, a pivot pin having a first cylindrical portion mounted in said body member for oscillatable movement and having a second cylindrical portion eccentrically disposed relative to the first cylindrical portion for pivotally supporting the lever intermediate its ends, means for turning the pin to adjust the axis of pivotal movement of said lever, means for locking said pin in adjusted position, means interconnecting the movable jaw and one end of said lever, said lever having inwardly directed cam surfaces on opposite ends thereof, and a cam member mounted for axial movement in the recess of said body and adapted to be attached to an axially movable actuating element, said cam member having a self-locking tapered portion thereon engageable with the cam surface on one end of said lever and operable in response to movement of said cam member in one direction for rocking said lever and moving said movable jaw to its closed position and locking it in said position, said cam member having a portion thereof engageable with the cam surface on the other end of said lever for rocking said lever and moving said movable jaw in the other direction to its open position and locking it in said position in response to movement of said cam member in the opposite direction.

References Cited in the file of this patent
UNITED STATES PATENTS

| 761,634 | Hungerford et al. | May 31, 1904 |
| 803,604 | Krug | Nov. 7, 1905 |
| 961,867 | Krug | June 21, 1910 |
| 1,455,351 | Olson | May 15, 1923 |